US012621191B2

(12) United States Patent
Dotlic et al.

(10) Patent No.: US 12,621,191 B2
(45) Date of Patent: May 5, 2026

(54) SYSTEM AND METHODS FOR GENERATING SUPERCOMPLEMENTARY ZERO-SUM CORRELATION SEQUENCE BLOCKS

(71) Applicant: Qorvo US, Inc., Greensboro, NC (US)

(72) Inventors: Igor Dotlic, Dublin (IE); Michael McLaughlin, Dublin (IE)

(73) Assignee: Qorvo US, Inc., Greensboro, NC (US)

( * ) Notice: Subject to any disclaimer, the term of this patent is extended or adjusted under 35 U.S.C. 154(b) by 316 days.

(21) Appl. No.: 18/403,389

(22) Filed: Jan. 3, 2024

(65) Prior Publication Data

US 2024/0243949 A1      Jul. 18, 2024

Related U.S. Application Data

(60) Provisional application No. 63/509,454, filed on Jun. 21, 2023, provisional application No. 63/480,086, filed on Jan. 16, 2023.

(51) Int. Cl.
*H04L 25/02* (2006.01)

(52) U.S. Cl.
CPC ........ *H04L 25/024* (2013.01); *H04L 25/0212* (2013.01)

(58) Field of Classification Search
CPC .......................... H04L 25/024; H04L 25/0212
See application file for complete search history.

(56) References Cited

U.S. PATENT DOCUMENTS

| | | | |
|---|---|---|---|
| 2015/0016488 A1* | 1/2015 | McLaughlin ........ | H04B 1/7183 |
| | | | 375/130 |
| 2018/0167150 A1* | 6/2018 | Clancy ................... | H04L 43/16 |

OTHER PUBLICATIONS

Dotlic et al, Low-Complexity Channel Estimation Using Supercomplementary Blocks of Sequences, 2023, IEEE, vol. 11 (Year: 2023).*
B Popovic, "Complementary Sets Based on Sequences with Ideal Periodic Autocorrelation" Electronics Letters 26(18):1428-1430 (Aug. 30, 1990) https://doi.org/10.1049/el:19900916.

* cited by examiner

*Primary Examiner* — Yaotang Wang
(74) *Attorney, Agent, or Firm* — Withrow & Terranova, P.L.L.C.

(57) ABSTRACT
A method for determining a channel impulse response (CIR) estimation in ultra-wideband (UWB) communication using a supercomplementary zero-sum correlation (SZC) sequence block is provided. The method includes, obtaining, from a memory, a basic sequence of N chips and having perfect periodic autocorrelation function (PACF), N being an odd number. The method also includes performing, by a shifting logic, a circular shift of the chips in the basic sequence by a shift number to obtain a shifted sequence, the shift number being a positive number less than N. The method also includes computing, by an inverting logic, an inversion parameter of the shifted sequence. The method also includes computing, by the inverting logic, a output sequence based on the shifted sequence and the inversion parameter; and receiving, by an antenna, a transmitted sequence. The method further includes performing, by a correlator circuit, cross-correlation between the output sequence and the received sequence.

20 Claims, 6 Drawing Sheets

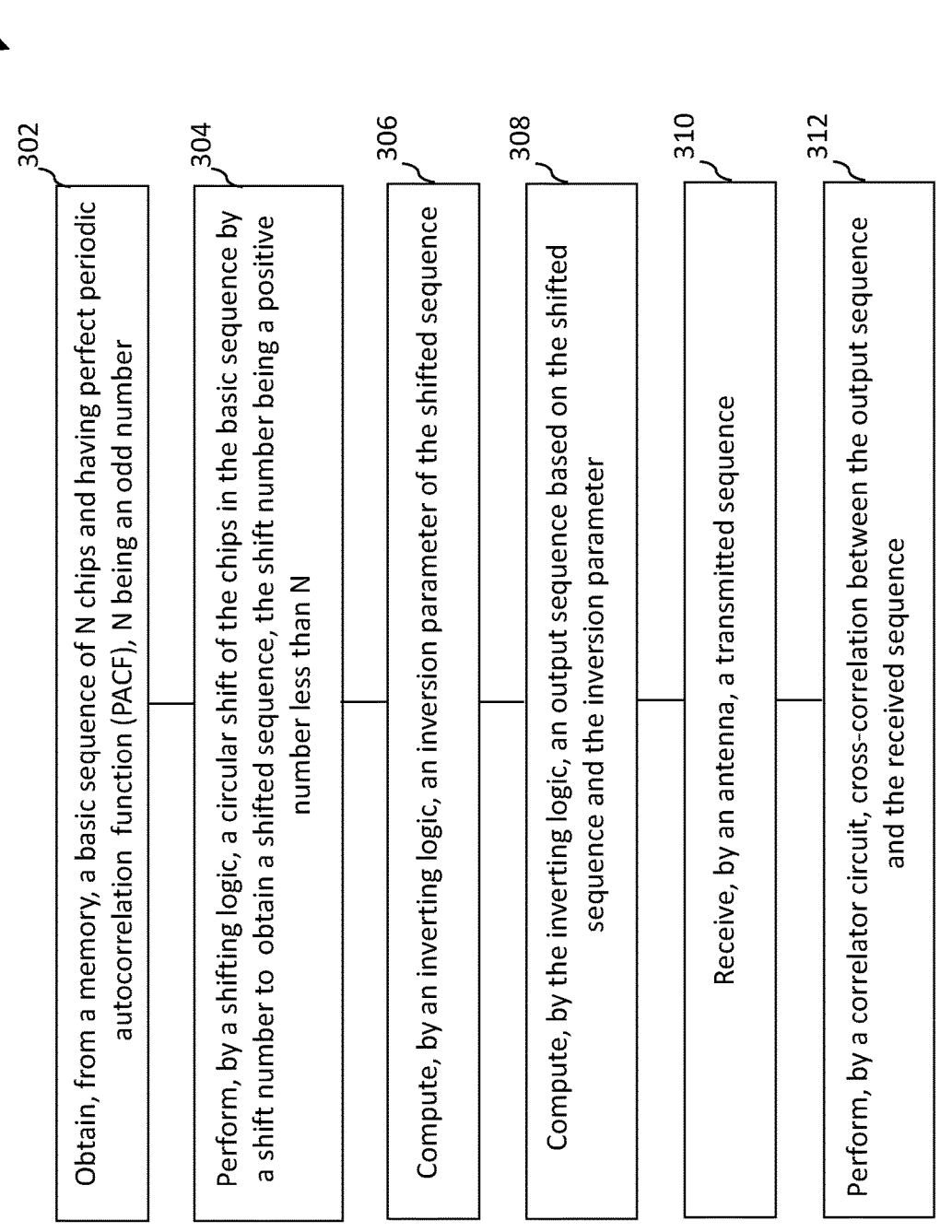

300

302

Obtain, from a memory, a basic sequence of N chips and having perfect periodic autocorrelation function (PACF), N being an odd number

304

Perform, by a shifting logic, a circular shift of the chips in the basic sequence by a shift number to obtain a shifted sequence, the shift number being a positive number less than N

306

Compute, by an inverting logic, an inversion parameter of the shifted sequence

308

Compute, by the inverting logic, an output sequence based on the shifted sequence and the inversion parameter

310

Receive, by an antenna, a transmitted sequence

312

Perform, by a correlator circuit, cross-correlation between the output sequence and the received sequence

FIG. 3A

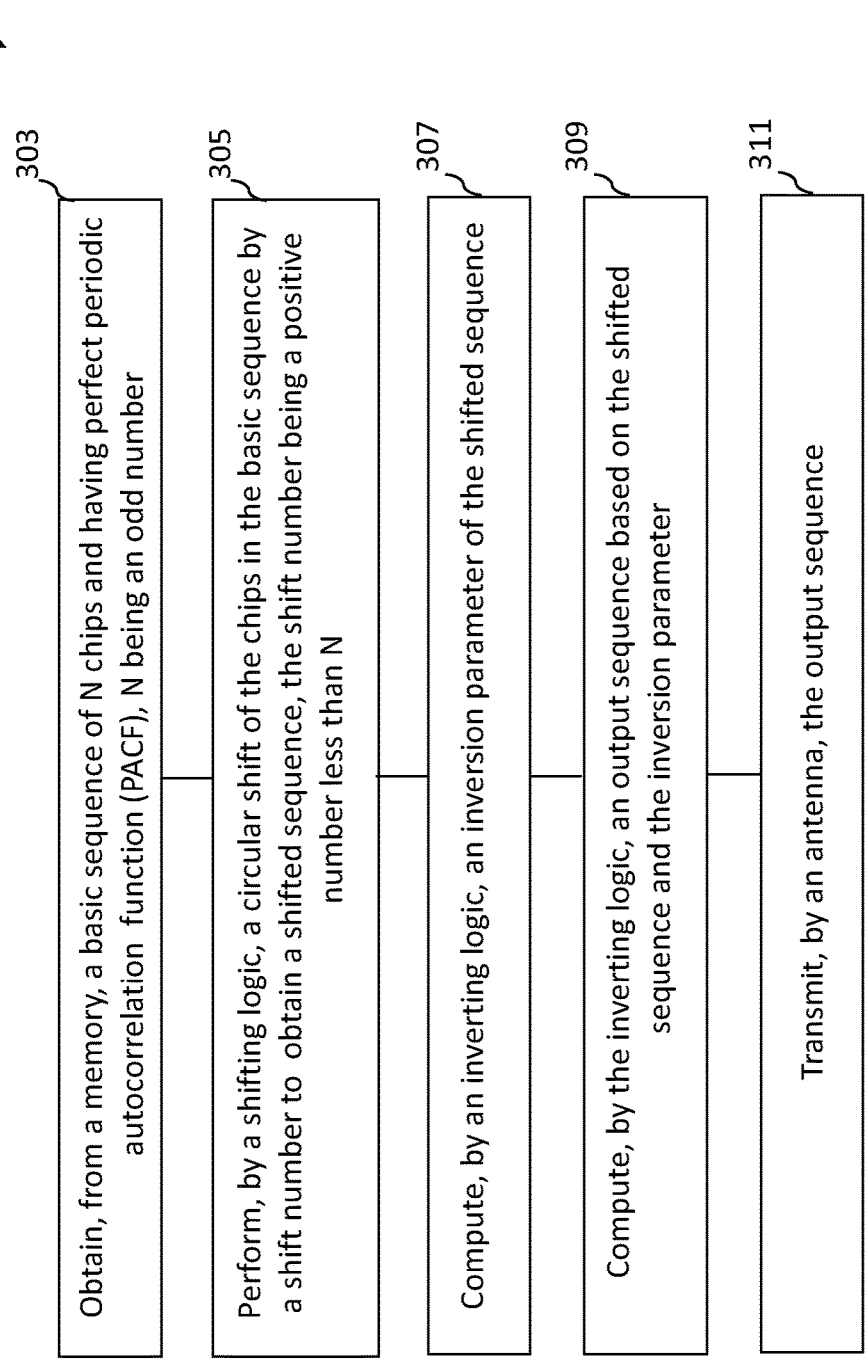

301

303 Obtain, from a memory, a basic sequence of N chips and having perfect periodic autocorrelation function (PACF), N being an odd number 305 Perform, by a shifting logic, a circular shift of the chips in the basic sequence by a shift number to obtain a shifted sequence, the shift number being a positive number less than N 307 Compute, by an inverting logic, an inversion parameter of the shifted sequence 309 Compute, by the inverting logic, an output sequence based on the shifted sequence and the inversion parameter 311 Transmit, by an antenna, the output sequence

FIG. 3B

SYSTEM AND METHODS FOR GENERATING SUPERCOMPLEMENTARY ZERO-SUM CORRELATION SEQUENCE BLOCKS

RELATED APPLICATIONS

This application claims priority to U.S. Provisional Patent Application No. 63/480,086 filed Jan. 16, 2023 and U.S. Provisional Patent Application No. 63/509,454 filed Jun. 21, 2023, which are incorporated by reference herein in their entireties.

FIELD OF THE DISCLOSURE

The present disclosure relates to channel estimation in ultra-wideband (UWB) communication, in particular, to system and methods for generating supercomplementary zero-sum (SZC) sequence blocks.

BACKGROUND

Ultra-wideband (UWB) is a wireless communication technology that uses a wide bandwidth, typically about 500 MHz or larger, or has a 10 dB bandwidth greater than 20% of the center frequency. Impulse UWB (IR-UWB) is a specific case of UWB in which the signal is transmitted by very short pulses (in the order of nano seconds). It is particularly adapted for ranging or sensing application as the pulses are robust against multipath. Another advantage of IR-UWB is its ability to transmit data with very low power consumption.

Ranging is a process of determining the distance between two devices using UWB technology. In current wireless communication systems, time-of-flight (TOF) is often employed to determine the distance between two devices/nodes in a UWB communication. A pseudo-random cipher code is often generated and transmitted between the two devices for the computation of a channel impulse response (CIR) to prevent the foreshortening of the TOF result by an attacker. The pseudo-random cipher code can improve the communication security between the devices, but may have undesirable correlation properties such as high distortion in CIR estimate, i.e., accumulator, (e.g., sidelobes) after correlation. Thus, a cipher code resulting in less distortion in the accumulation is desired.

SUMMARY

An aspect of the present disclosure provides a method for determining a channel impulse response (CIR) estimation in ultra-wideband (UWB) communication using a supercomplementary zero-sum correlation (SZC) sequence block. The method includes obtaining, from a memory, a basic sequence of N chips and having perfect periodic autocorrelation function (PACF), N being an odd number. The method also includes performing, by a shifting logic, a circular shift of the chips in the basic sequence by a shift number to obtain a shifted sequence, the shift number being a positive number less than N. The method also includes computing, by an inverting logic, an inversion parameter of the shifted sequence. The method also includes computing, by the inverting logic, an output sequence based on the shifted sequence and the inversion parameter; and receiving, by an antenna, a transmitted sequence. The method further includes performing, by a correlator circuit, cross-correlation between the output sequence and the received sequence.

In some embodiments, the method further includes accumulating, by an accumulator circuit, a correlated sequence to generate the CIR estimation.

In some embodiments, the basic sequence comprises at least one of an Ipatov ternary sequence or a Zadoff-Chu polyphase sequence.

In some embodiments, the method further includes determining a counter number of the basic sequence before the performing of the circuit shift and the computing of the inversion parameter based on an order of the output sequence in the SZC sequence block.

In some embodiments, the method further includes determining the shift number based on the counter number of the basic sequence and N.

In some embodiments, the method further includes determining the inversion parameter based on the counter number of the basic sequence and N.

In some embodiments, the circular shift of the chip is performed by shifting chips of the shift number from a left side of the basic sequence to a right side of the basic sequence.

In some embodiments, the method includes generating (M+1) output sequences, M being a product of a number of block repetitions and 2N.

In some embodiments, the received sequence is one of (M−1) output sequences, the (M−1) output sequences excluding a first and a last output sequence of the (M+1) output sequences.

Another aspect of the present disclosure provides a method for determining a CIR estimation in UWB communication using a SZC sequence block. The method includes obtaining, from a memory, a basic sequence of N chips and having perfect periodic autocorrelation function (PACF), N being an odd number. The method also includes performing, by a shifting logic, a circular shift of the chips in the basic sequence by a shift number to obtain a shifted sequence, the shift number being a positive number less than N. The method also includes computing, by an inverting logic, an inversion parameter of the shifted sequence. The method also includes computing, by the inverting logic, an output sequence based on the shifted sequence and the inversion parameter. The method further includes transmitting, by an antenna, the output sequence.

In some embodiments, the basic sequence comprises at least one of an Ipatov ternary sequence or a Zadoff-Chu polyphase sequence.

In some embodiments, the method further includes determining a counter number of the basic sequence based on an order of the output sequence in the SZC sequence block, before the performing of the circuit shift and the computing of the inversion parameter.

In some embodiments, the method further includes determining the shift number based on the counter number of the basic sequence and N.

In some embodiments, the method further includes determining the inversion parameter based on the counter number of the basic sequence and N.

In some embodiments, the circular shift of the chip is performed by shifting chips of the shift number from a left side of the basic sequence to a right side of the basic sequence.

In some embodiments, the method includes generating (M+1) output sequences, M being a product of a number of block repetitions and 2N.

In some embodiments, the transmitting of the output sequence comprises transmitting (M−1) output sequences of the (M+1) output sequences, the (M−1) output sequences excluding a first and a last output sequence of the (M+1) output sequences.

Another aspect of the present disclosure provides a UWB device. The UWB device includes a transceiver operable to perform a UWB communication, a memory for storing program instructions and a database of basic sequences, and a processor coupled to the transceiver and to the memory. The processor is operable to execute the program instructions, which, when executed by the processor, cause the UWB device to perform the following to generate channel impulse response (CIR) estimation based on a supercomplementary zero-sum correlation (SZC) sequence block. The operations include: obtaining, from a memory, a basic sequence of N chips and having perfect periodic autocorrelation function (PACF), N being an odd number; performing, by a shifting logic, a circular shift of the chips in the basic sequence by a shift number to obtain a shifted sequence, the shift number being a positive number less than N; computing, by an inverting logic, an inversion parameter of the shifted sequence; computing, by the inverting logic, a output sequence based on the shifted sequence and the inversion parameter; receiving a transmitted sequence; and performing, by a correlator circuit, cross-correlation between the output sequence and the received sequence.

In some embodiments, the processor is further configured to accumulate, by an accumulator circuit, a correlated sequence to generate the CIR estimation.

In some embodiments, the basic sequence comprises at least one of an Ipatov ternary sequence or a Zadoff-Chu polyphase sequence.

In some embodiments, the processor is further configured to determine a counter number of the basic sequence based on an order of the output sequence in the SZC sequence block, before the performing of the circuit shift and the computing of the inversion parameter.

In some embodiments, the processor is further configured to determine the shift number based on the counter number of the basic sequence and N.

In some embodiments, the processor is further configured to determine the inversion parameter based on the counter number of the basic sequence and N.

In some embodiments, the circular shift of the chip is performed by shifting chips of the shift number from a left side of the basic sequence to a right side of the basic sequence.

In some embodiments, the processor is configured to generate (M+1) output sequences, M being a product of a number of block repetitions and 2N.

In some embodiments, the received sequence is one of (M−1) output sequences, the (M−1) output sequences excluding a first and a last output sequence of the (M+1) output sequences.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description, serve to explain the principles of the disclosure.

FIG. 3A illustrates a method for generating a CIR estimation using a SZC sequence block by a receiver, according to some aspects of the present disclosure.

FIG. 3B illustrates a method for generating a SZC sequence block for a CIR estimation by a transmitter, according to some aspects of the present disclosure.

DETAILED DESCRIPTION

Figure 1A:
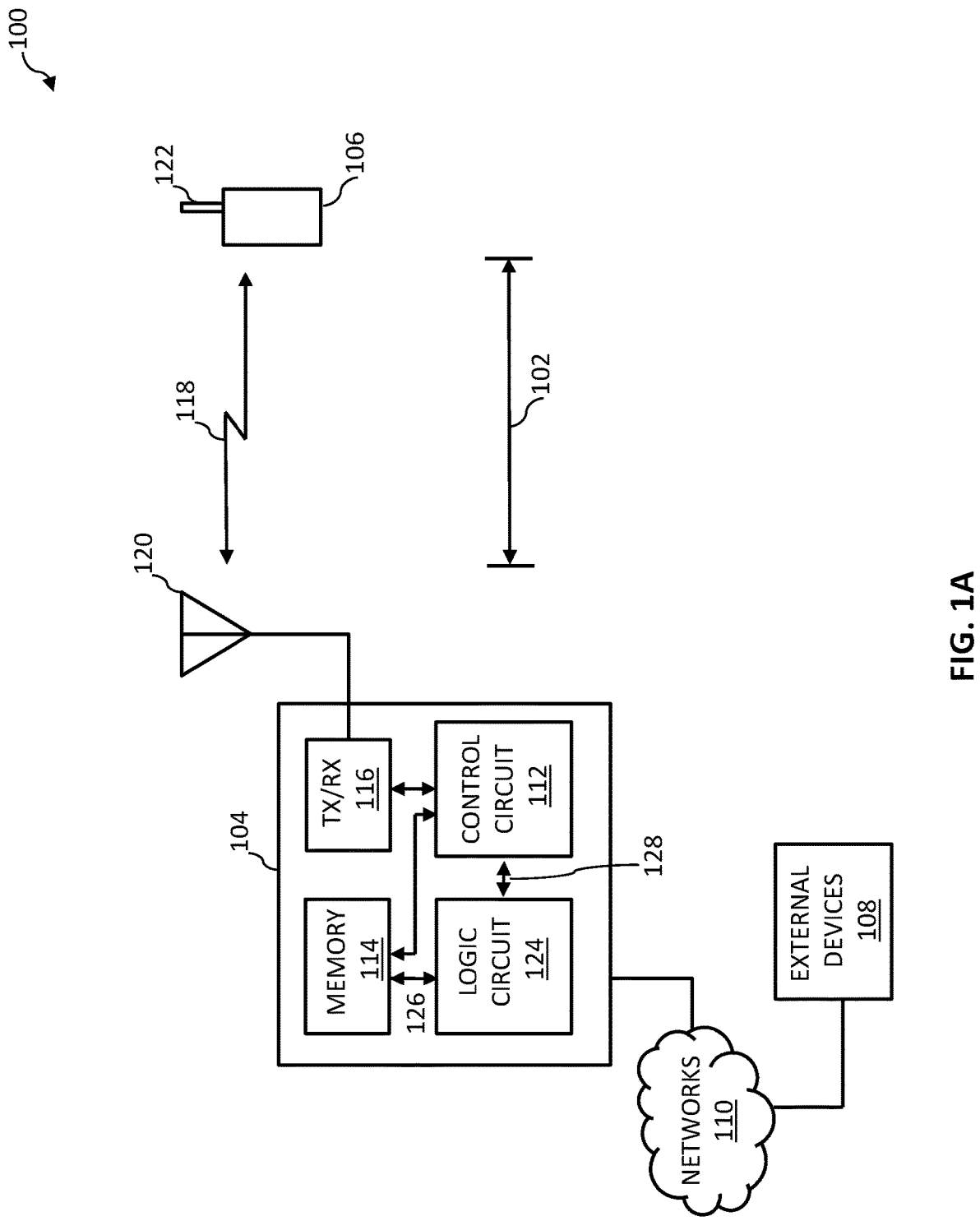
FIG. 1A illustrates a block diagram of an exemplary communication system, according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Additionally, like reference numerals denote like features throughout specification and drawings.

It should be appreciated that the blocks in each signaling diagram or flowchart and combinations of the signaling diagrams or flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each signaling diagram or flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction for performing the functions described in connection with a block(s) in each signaling diagram or flowchart. Since the computer program instructions may be equipped in a computer or other programmable data processing devices, instructions that generate a process executed by a computer as a series of operational steps are performed by the computer or other programmable data processing devices and operate the computer or other programmable data processing devices may provide steps for executing the functions described in connection with a block(s) in each signaling diagram or flowchart.

Each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

Hereinafter, embodiments are described in detail with reference to the accompanying drawings. Further, although a communication system using ultra-wideband (UWB) is described in connection with embodiments, as an example, the embodiments may also apply to other communication systems with similar technical background or features. For example, a communication system using Bluetooth or Zig-Bee may be included therein. Further, embodiments may be modified in such a range as not to significantly depart from the scope of the present disclosure under the determination by one of ordinary skill in the art and such modifications may be applicable to other communication systems.

UWB may refer to a short-range high-rate wireless communication technology using a wide frequency band of several GHz or more, low spectral density, and short pulse width (e.g., 1 nsec to 4 nsec) in a baseband state. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known, also referred to as anchor devices). The present disclosure assumes that the user is carrying a device capable of communicating through UWB (referred to as "UWB-enabled device" or simply as "UWB device").

In this disclosure, a symbol is a sequence of chips. Term "symbol" and term "sequence" may be used interchangeably.

In some communication system, a scrambled timestamp sequence (STS), generated cryptographically, can be used to generate the CIR. On the receiver side, the STS often undergoes correlation and accumulation to generate the CIR.

However, the STS may have undesirable correlation properties, such as correlation artifacts (e.g., sidelobes), after correlation. The correlation artifacts can further result in distortion in the accumulation, impairing the CIR estimation and further the ranging and communication security. Thus, a cipher code resulting in reduced correlation artifacts is desired.

The SZC sequence blocks, as described in U.S. application Ser. No. 18/110,541, herein incorporated by reference in its entirety, are deterministic sequence blocks that are known by both the transmitter and the receiver. The SZC sequence blocks solve a particular problems in CIR estimation. That is, if the SZC sequence blocks are used, signal distortions that are consistent from sequence to sequence, the most prominent one being carrier frequency offset (CFO), do not produce any correlation sidelobes in the CIR estimation.

Embodiment of the present disclosure describes a novel system and method for generating a SZC sequence block, which is used in cross-correlation and CIR estimation in a communication system. The SZC sequence block may be generated by both the transmitter and the receiver. The transmitter may transmit part of the SZC block, which is received by the receiver and is used for cross-correlation and CIR estimation. The SZC sequences are transmitted without any guard intervals. The receiver may remove the CFO in the correlated signal, and the processed signal is then used in accumulation to generate a CIR estimation. The processed signal, after the CFO removal, has little or no sidelobes, and the CIR estimation accumulated from the signal has little or no distortion.

A SZC sequence block can be generated using a base sequence and a logic circuit in both the transmitter and the receiver. The base sequence may have an odd length and have perfect periodic autocorrelation function (PACF). For example, the perfect PACF sequences in UWB are those specified in the IEEE 802.15.4 standard for UWB HRP (High Rate Pulse (repetition frequency)) PHY (Physical Layer) SHR (Synchronization header) packet field, e.g., Ipatov ternary sequences of odd lengths. Any other perfect PACF class of sequences with odd length can be also used, e.g., Zadoff-Chu polyphase sequences. The logic circuit may convert the basic sequence to an output SZC sequence, which is part of the SZC sequence block. The logic circuit includes a symbol counter to generate a counter number for the basic sequence, a shifting logic to shift one or more chips in the basic sequence, and an inversion logic to compute symbol inversion. In some embodiments, the transmitter and/or the receiver can be stored with the basic sequence for generating the sequence block, without storing the sequence block permanently, saving space.

FIG. 1A illustrates an exemplary communication system 100 include a first device 104 and a second device 106, according to some embodiments. In some embodiments, communication system 100 may be employed as a location-finding system that determines a distance 102 between first device 104 and second device 106. In some embodiments, first device 104 may be a source, while second device 106 may include a mobile device. First device 104 and second device 106 may communicate with each other through wireless communication. First device 104, provided at a fixed or known location, may be part of another device and/or coupled to external devices 108 through networks 110 such as Internet, the Public Switched Telephone Network (PSTN), or the like. External devices 108 may include any suitable devices that can be communicatively coupled to first device 104 through networks 110, such as an application server. In some embodiments, location-based services may be provided by the external devices 108 when the location of second device 106 is determined. In some embodiments, first device 104 is part of another device that may provide location-based services based on the measurement result of distance 102.

First device 104 may include a control circuit 112, a memory 114, a transceiver 116, and a logic circuit 124. Control circuit 112 may be communicatively coupled to memory 114, transceiver 116, and logic circuit 124. Logic circuit 124 may be communicatively coupled to memory 114. First device 104 may send and receive signals 118 through an antenna 120 using transceiver 116. Control circuit 112 may include any suitable software and/or hardware for controlling the functions of first device 104. For example, control circuit 112 may include a processor, such as a Central Processing Unit (CPU). Logic circuit 124 may generate a plurality of SZC sequences, which form a SZC sequence block. Memory 114 may include a random-access memory (RAM), a read-only memory (ROM), an electrically erasable programmable ROM (EEPROM), an optical disk storage, a magnetic disk storage, and/or the like. Operating software, data, and/or signal symbols may be stored in memory 114 for use. For example, a basic sequence and certain parameters used for generating the SZC sequences may be pre-stored in memory 114. In some embodiments, memory 114 is used to buffer the generated SZC sequences before and/or after transmission. Logic circuit 124 may receive the basic sequence 126 from memory 114, and generate the SZC sequences 128. First device 104 may include an antenna 120, communicatively coupled to transceiver 116, for receiving and sending signals such as SZC sequence blocks. Control circuit 112 may transmit the SZC sequences 128 to transceiver 116, and further antenna 120 to transmit the SZC sequences 128 to second device 106. In some embodiments, transceiver 116 may transmit part of the SZC sequence block (e.g., as an example of signals 118) to second device 106 through antenna 120.

Figure 1B:
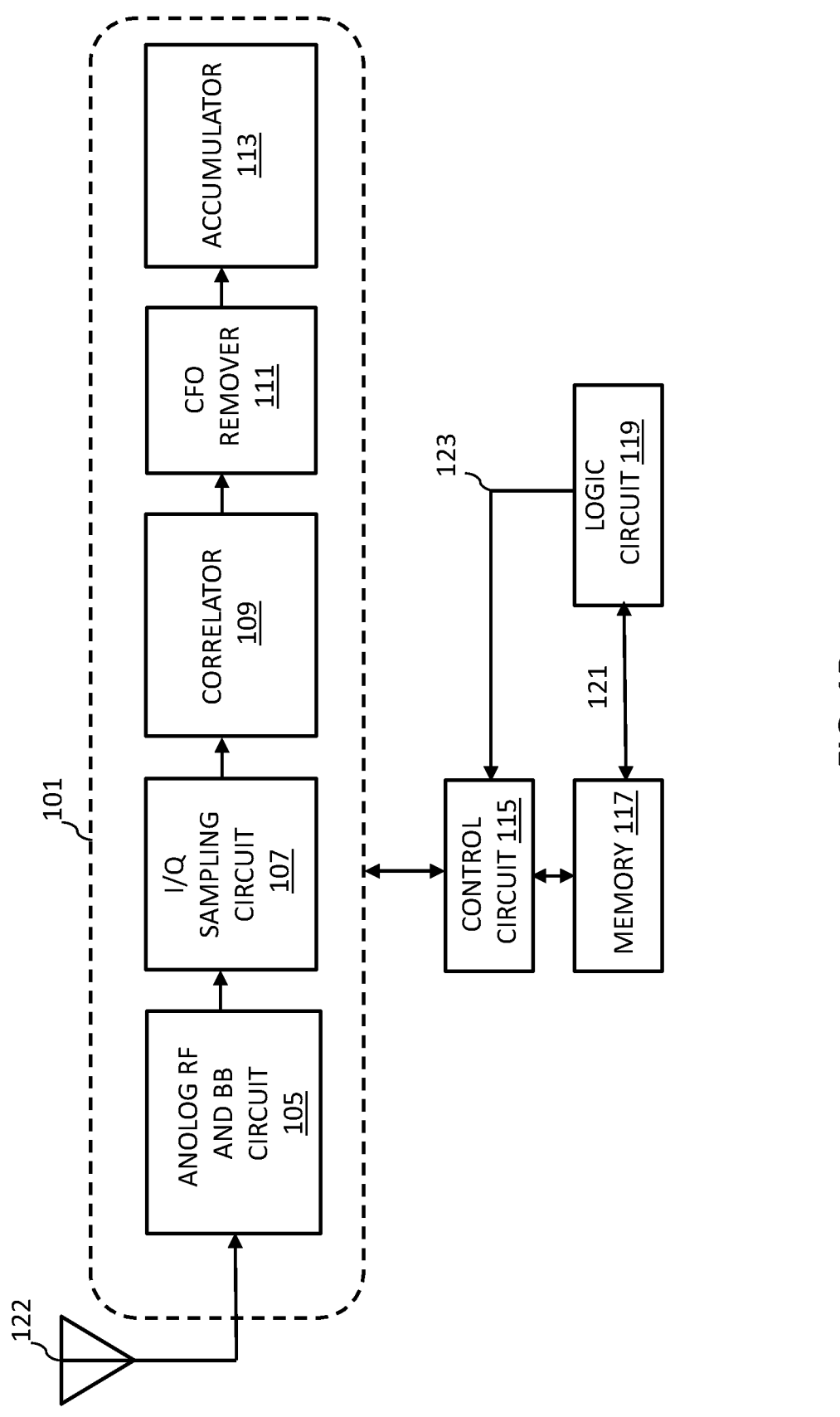
FIG. 1B illustrates a block diagram of a receiver with an exemplary logic circuit, according to some embodiments of the present disclosure.

Second device 106 may include a portable computing device such as a smartphone, a laptop, a tablet, a wearable device, or the like. As shown in FIGS. 1A and 1B, second device 106 may include a receiver 101 and an antenna 122 communicatively coupled together for receiving and sending signals such as sequence blocks. Second device 106 may also include a control circuit 115, a memory 117, and a logic circuit 119. Control circuit 115 may be communicatively coupled to memory 117 and logic circuit 119, and logic circuit 119 may be communicatively coupled to memory 117. Control circuit 115 may include any suitable software and/or hardware for controlling the functions of second device 106. For example, control circuit 115 may include a processor, such as a CPU. Memory 117 may include a random-access memory (RAM), a read-only memory (ROM), an electrically erasable programmable ROM (EEPROM), an optical disk storage, a magnetic disk storage, and/or the like. Operating software, data, and/or signal symbols may be stored in memory 117 for use. For example, a basic sequence and certain parameters used for generating the SZC sequences may be pre-stored in memory 117. In some embodiments, memories 114 and 117 store the same basic sequence and parameters for generating the same SZC sequences. In some embodiments, memory 117 is used to buffer the generated SZC sequences and/or the received SZC sequences (e.g., in signals 118 from first device 104) for cross-correlation. Logic circuit 119 may receive the same basic sequence 121 from memory 117, and generate the same SZC sequences 123 as logic device 124. Control circuit 115 may transmit the SZC sequences 123 to receiver 101 for future use such as cross-correlation. Receiver 101 may perform cross-correlation between the SZC sequences generated by logic circuit 119 and the SZC sequence received by antenna 122, and used the autocorrelated data to generate CIR estimation.

As shown in FIG. 1B, in some embodiments, receiver 101 may include an analog and radio frequency (RF) and baseband (BB) processing circuit 105 that takes the received SZC sequences and provides front-end processing (e.g., amplification, filtering, down conversion to a BB frequency) and passes a BB signal to an in-phase/quadrature (I/Q) sampling circuit 107. A sampled SZC sequence is transmitted to a correlator 109. The SZC sequences generated by logic circuit 119 may also be transmitted to correlator 109. Correlator 109 may correlate the sampled SZC sequences and the generated SZC sequences (by logic circuit 119). After the cross-correlation, the correlated signals are transmitted to a CFO remover 111 that removes the CFO in the correlated signals. The signals after the CFO removal are then transmitted to an accumulator 113 to be accumulated. A CIR estimation can be generated from the accumulated signal. In some embodiments, control circuit 115 may then compute a TOF and/or a distance 102 based on the CIR estimation. In some embodiments, control circuit 115 may transmit the CIR estimation to first device 104 such that control circuit 112 may compute distance 102. In some embodiments, based on the calculated distance 102, first device 104 (or control circuit 112) and/or external devices 108 provide location-based services.

In various embodiments, first device 104 and second device 106 may each include a UWB communication interface, a Bluetooth communication interface, a Wi-Fi communication interface, a cellular network connection (e.g., 4G, 5G) interface, a near field communication (NFC) interface, a ZigBee communication interface, or a combination thereof. In some embodiments, first device 104 and second device 106 are each a UWB device.

Figure 2A:
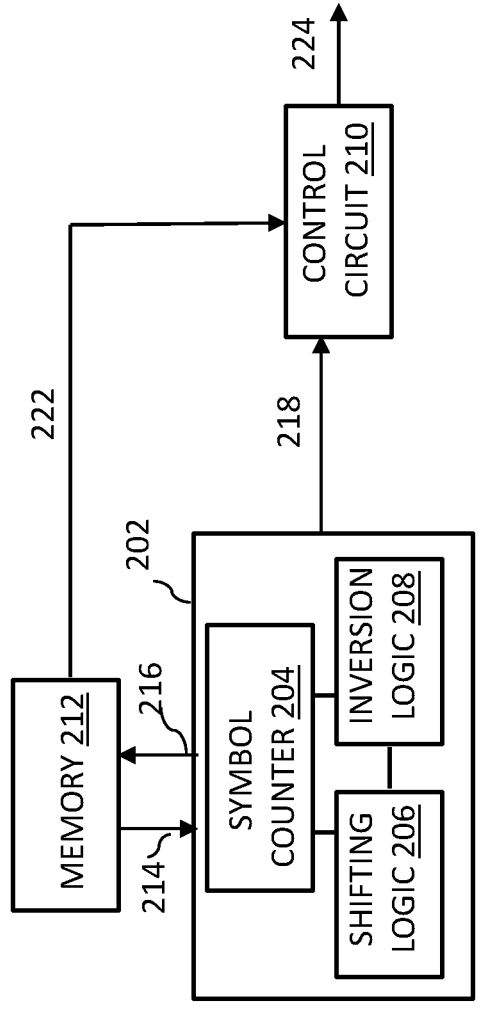
FIG. 2A illustrates a block diagram of an exemplary logic circuit in a transmitter and a receiver in the communication system of FIG. 1A, according to some embodiments of the present disclosure.
Figure 2B:
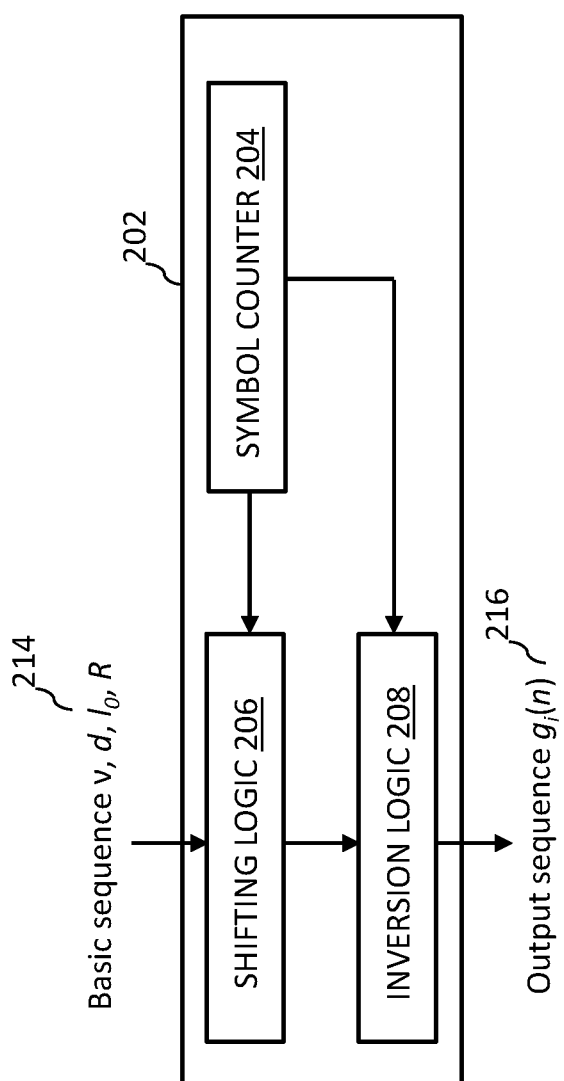
FIG. 2B illustrates a block diagram of an exemplary logic circuit generating a SZC sequence, according to some embodiments of the present disclosure.

FIGS. 2A and 2B illustrate a block diagram of a logic circuit and an process to generate a SZC sequence block using the logic circuit, according to some embodiments. Memory 212 may be an example of memory 114 and 117, control circuit 210 may be an example of control circuit 112 and 115, and logic circuit 202 may be an example of logic circuit 124 and 119. Logic circuit 202 may be a newly added component to an existing communication system or may make use of existing devices of an existing communication system. First device 104 and second device 106 may each generate SZC sequences using the process shown in FIGS. 2A and 2B.

As shown in FIGS. 2A and 2B, logic circuit 202 may include a symbol counter 204, a shifting logic 206, and an inversion logic 208, each being communicatively coupled. Control logic 202 may generate a plurality of SZC sequences that form a SZC sequence block. To generate a SZC sequence, logic circuit 202 may receive a data set 214 from memory 212. Data set 214 may include a basic sequence v that is pre-stored in memory 212 and may have N chips, N being an odd number. For example, N may be 5, 7, 9, 11, 13, etc. Basic sequence v may have perfect periodic autocorrelation function (PACF). In some embodiments, basic sequence v may include an Ipatov ternary sequence and/or a Zadoff-Chu polyphase sequence. Data set 214 may also include other parameters for computation of the SZC sequence. In some embodiments, data set 214 includes a circular shift steps between consecutive symbols/sequences d, an initial circular shift step $l_0$, and a number of block repetitions R. In some embodiments, a SZC sequence block includes 2N sequences/symbols and may include 2N×N chips. In some embodiments, a sub-block is a set of N consecutive sequences/symbols, and a block is set of 2N consecutive sequences/symbols.

For each basic sequence v(n), symbol counter 204 may generate (2RN+2) consecutive symbol indices, which includes i=−1, 0, 1, . . . , 2RN. For each symbol index i, shifting logic 206 and inversion logic 208 may generate an output sequence $g_i(n)$ that includes N chips and is a half row in the SZC sequence block. In some embodiments, for a given symbol index, shifting logic 206 may first calculate a circular shift $l_i$ of the basic sequence vas $l_i=(l_0+d\times i)$ mod N, where mod represents a modulus operation. Shifting logic 206 may then convert basic sequence v(n) to a circularly shifted sequence $v_i(n)$ as $v_i(n)=v((l_i+n)$ mod N), n being a chip index within the sequence and being equal to 0, 1, . . . , N−1. In some embodiments, shifting logic 206 includes a circular shifting register.

Inversion logic 208 may calculate a sub-block index j(i) as j(i)=i div N, where div represents a division operation. Inversion logic 208 may then calculate a block index k(i) as: k(i)=i div 2N, and a sequence/symbol p(i) inversion as p(i)=(1−2(i mod 2)(j(i)mod 2))(1−2(k(i) mod 2)). Inversion logic 208 may also calculate an output sequence 216 $g_i(n)$ as $g_i(n)=v_i(n)\times p$. For i=−1, 0, 1, . . . , M (M=2RN), $g_i(n)$ can be calculated as:

$$g_i(n) = v((l_0 + d \times (N - 1) + n)\bmod N),\ \text{for}\ i = -1;$$

$$g_i(n) = v((l_0 + d \times i + n)\bmod N) \times$$

$$(1 - 2(i\bmod 2)(j\bmod 2))(1 - 2(k\bmod 2)),\ \text{for}\ 0 \le i \le M - 1;\ \text{and}$$

$$g_i(n) = (-1)^{1+(R\,div\,2)} v((l_0 + n)\bmod N),\ \text{for}\ i = M.$$

For first device 104, $g_{-1}(n)$ and $g_M(n)$ are not transmitted, while $g_0(n)$-$g_{M-1}(n)$ are transmitted to second device 106 for cross-correlation. Second device 106 (or logic circuit 119) may generate $g_{-1}(n)$-$g_M(n)$ may perform cross-correlation between the received $g_0(n)$-$g_{M-1}(n)$ from first device 104 and the generated $g_{-1}(n)$-$g_M(n)$.

In an example, N=7, basic sequence v(n)=[++−00+0], R=2, and M=28. In the ternary sequence notation, the symbol '+' denotes +1 and the symbol '−' denotes −1. At i=1, circular shift $l_1$ may be calculated as: $l_1=(l_0+d\times 1)$ mod 7=5, which indicates basic sequence v(n)=[++−00+0] circularly shifted 5 positions to the left to obtain: $v_1(n)=[+0++−00]$. Sub-block index j(1) may be calculated as j(1)=1 div 7=0, block index k(1) may be calculated as k(1)=1 div 14=0, sequence inversion p(1) may be calculated as p(1)=(1−2(1 mod 2)(j(1) mod 2))(1−2(k(1) mod 2))=(1−2×1×(0 mod 2)) (1−2(0 mod 2))=1, and $g_1(n)$ may be calculated as $g_1(n)=v_1$ (n)×p(1)=$v_1(n)$×1=$v_1(n)$=[+0++−00]. Table 1 shows the i=−1, . . . , 28, the $l_i$, $v_i(n)$, j(i), k(i), p(i), and $g_i(n)$ correspond to respective i.

TABLE 1

| i | $l_i$ | $v_i(n)$ | j(i) | k(i) | p(i) | $g_i(n)$ |
|---|---|---|---|---|---|---|
| −1 | 1 | +−00+0+ | −1 | −1 | 1 | +−00+0+ |
| 0 | 3 | 00+0++− | 0 | 0 | 1 | 00+0++− |
| 1 | 5 | +0++−00 | 0 | 0 | 1 | +0++−00 |
| 2 | 0 | ++−00+0 | 0 | 0 | 1 | ++−00+0 |
| 3 | 2 | −00+0++ | 0 | 0 | 1 | −00+0++ |
| 4 | 4 | 0+0++−0 | 0 | 0 | 1 | 0+0++−0 |

10

TABLE 1-continued

| i | $l_i$ | $v_i(n)$ | j(i) | k(i) | p(i) | $g_i(n)$ |
|---|---|---|---|---|---|---|
| 5 | 6 | 0+−−00+ | 0 | 0 | 1 | 0+−−00+ |
| 6 | 1 | +−00+0+ | 0 | 0 | 1 | +−00+0+ |
| 7 | 3 | 00+0++− | 1 | 0 | −1 | 00−0−−+ |
| 8 | 5 | +0++−00 | 1 | 0 | 1 | +0++−00 |
| 9 | 0 | ++−00+0 | 1 | 0 | −1 | −−+00−0 |
| 10 | 2 | −00+0++ | 1 | 0 | 1 | −00+0++ |
| 11 | 4 | 0+0++−0 | 1 | 0 | −1 | 0−0−−+0 |
| 12 | 6 | 0+−−00+ | 1 | 0 | 1 | 0+−−00+ |
| 13 | 1 | +−00+0+ | 1 | 0 | −1 | −+00−0− |
| 14 | 3 | 00+0++− | 2 | 1 | −1 | 00−0−−+ |
| 15 | 5 | +0++−00 | 2 | 1 | −1 | −0−−+00 |
| 16 | 0 | ++−00+0 | 2 | 1 | −1 | −−+00−0 |
| 17 | 2 | −00+0++ | 2 | 1 | −1 | +00−0−− |
| 18 | 4 | 0+0++−0 | 2 | 1 | −1 | 0−0−−+0 |
| 19 | 6 | 0+−−00+ | 2 | 1 | −1 | 0−−++00− |
| 20 | 1 | +−00+0+ | 2 | 1 | −1 | −+00−0− |
| 21 | 3 | 00+0++− | 3 | 1 | 1 | 00+0++− |
| 22 | 5 | +0++−00 | 3 | 1 | −1 | −0−−+00 |
| 23 | 0 | ++−00+0 | 3 | 1 | 1 | ++−00+0 |
| 24 | 2 | −00+0++ | 3 | 1 | −1 | +00−0−− |
| 25 | 4 | 0+0++−0 | 3 | 1 | 1 | 0+0++−0 |
| 26 | 6 | 0+−−00+ | 3 | 1 | −1 | 0−−+00− |
| 27 | 1 | +−00+0+ | 3 | 1 | 1 | +−00+0+ |
| 28 | 3 | 00+0++− | 4 | 2 | 1 | 00+0++− |

First device 104 (or transceiver 116) may transmit two SZC sequence blocks from the generated output sequences 216 $g_i(n)$, (e.g., i=0, . . . , M−1). For first device 104, in some embodiments, logic circuit 202 may transmit output sequences 216 $g_i(n)$ to memory 212 in data set 216 for storing or buffering, e.g., for future use, after output sequences 216 $g_i(n)$ are generated. In some embodiments, logic circuit 202 may transmit output sequences 216 $g_i(n)$ to control circuit 210 in data set 218 that is further transmitted by control circuit 210 to the transmitter (e.g., transceiver 116) for transmission.

Second device 106 (or receiver 101) may receive the two sequence blocks from first device 104. Second device 106 may also generate the same output sequences 216 $g_i(n)$ using the same basic sequence v for i=−1, 0, . . . , M. For second device 106, in some embodiments, logic circuit 202 may transmit output sequences 216 $g_i(n)$ to memory 212 in data set 216 for storing or buffering, e.g., for future use, after output sequences 216 $g_i(n)$ are generated. In some embodiments, logic circuit 202 may retrieve the stored output sequences 216 $g_i(n)$ in data set 222 for perform CFO removal and cross-correlation together with the received two sequence blocks. In some embodiments, data set 222 also includes the received two sequence blocks that are buffered in memory for processing.

FIG. 3A is a flowchart of a method 300 for generating and handling a SZC sequence by a receiver (e.g., second device 106 or receiver 101), according to some embodiments of the present disclosure. Method 300 is merely an example, and is not intended to limit the present disclosure beyond what is explicitly recited in the claims. Additional operations can be provided before, during, and after the method 300, and some operations described can be replaced, eliminated, or moved around for additional embodiments of method 300. For ease of illustration, FIG. 3A is described in connection with FIGS. 1A, 1B, 2A, and 2B.

At step 302, a basic sequence of N chips is obtained from a memory. The basic sequence may have PACF. N may be an odd number. Referring back to FIGS. 1B, 2A, and 2B, basic sequence v (e.g., basic sequence 121 or in data set 214) may be obtained from memory 212 (or memory 117). In some embodiments, basic sequence ν includes an Ipatov ternary sequence and/or a Zadoff-Chu polyphase sequence.

At step 304, a shifting logic performs a circuit shift of the chips in the basic sequence by a shift number to obtain a shifted sequence, the shift number being a positive number less than N. Referring back to FIGS. 2B, a circular shift $l_i$ may be calculated, and a circularly shifted sequence $v_i(n)$ may be calculated by shifting logic 206.

As step 306, an inverting logic computes an inversion parameter of the shifted sequence. Referring back to FIG. 2B, inversion parameters such as a sub-block index j(i), a block index k(i), and a sequence inversion p(i) may be calculated by inversion logic 208.

At step 308, the inverting logic computes an output sequence based on the shifted sequence and the inversion parameter. Referring back to FIG. 2B, an output sequence $g_i(n)$ may be computed by inverting logic 208 based on circularly shifted sequence $v_i(n)$ and the inversion parameters.

At step 310, an antenna, coupled to the receiver, may receive a transmitted sequence. Referring back to FIGS. 1A and 1B, antenna 122 may receive a SZC sequence transmitted from a transmitter (e.g., first device 104 or transceiver 116).

At step 312, a correlator circuit may perform cross-correlation between the output sequence $g_i(n)$ and the received sequence. Referring back to FIG. 1B, correlator 109 may perform cross-correlation between output sequence $g_i(n)$ and the received SZC sequence.

FIG. 3B is a flowchart of a method 301 for generating and handling a SZC sequence by a transmitter (e.g., first device 104 or transceiver 116), according to some embodiments of the present disclosure. Method 301 is merely an example, and is not intended to limit the present disclosure beyond what is explicitly recited in the claims. Additional operations can be provided before, during, and after the method 301, and some operations described can be replaced, eliminated, or moved around for additional embodiments of method 301. For ease of illustration, FIG. 3B is described in connection with FIGS. 1A, 1B, 2A, and 2B.

At step 303, a basic sequence of N chips is obtained from a memory. The basic sequence may have PACF. N may be an odd number. Referring back to FIGS. 1A, 2A, and 2B, basic sequence ν (e.g., basic sequence 126 or in data set 214) may be obtained from memory 212 (or memory 114). In some embodiments, basic sequence ν includes an Ipatov ternary sequence and/or a Zadoff-Chu polyphase sequence.

At step 305, a shifting logic performs a circuit shift of the chips in the basic sequence by a shift number to obtain a shifted sequence, the shift number being a positive number less than N. Referring back to FIGS. 2B, a circular shift $l_i$ may be calculated, and a circularly shifted sequence $v_i(n)$ may be calculated by shifting logic 206.

As step 307, an inverting logic computes an inversion parameter of the shifted sequence. Referring back to FIG. 2B, inversion parameters such as a sub-block index j(i), a block index k(i), and a sequence inversion p(i) may be calculated by inversion logic 208.

At step 309, the inverting logic computes an output sequence based on the shifted sequence and the inversion parameter. Referring back to FIG. 2B, an output sequence $g_i(n)$ may be computed by inverting logic 208 based on circularly shifted sequence $v_i(n)$ and the inversion parameters.

At step 311, an antenna, coupled to the transmitter, may transmit the output sequence. Referring back to FIG. 1A, antenna 120 may transmit the generated SZC sequence to second device 106 (or antenna 122).

Those skilled in the art will recognize improvements and modifications to the preferred embodiments of the present disclosure. All such improvements and modifications are considered within the scope of the concepts disclosed herein and the claims that follow.

What is claimed is:

1. A method for determining a channel impulse response (CIR) estimation in ultra-wideband (UWB) communication using a supercomplementary zero-sum correlation (SZC) sequence block, comprising:
   obtaining, from a memory, a basic sequence of N chips and having perfect periodic autocorrelation function (PACF), N being an odd number;
   performing, by a shifting logic, a circular shift of the chips in the basic sequence by a shift number to obtain a shifted sequence, the shift number being a positive number less than N;
   computing, by an inverting logic, an inversion parameter of the shifted sequence; and
   computing, by the inverting logic, a output sequence based on the shifted sequence and the inversion parameter;
   receiving, by an antenna, a transmitted sequence; and
   performing, by a correlator circuit, cross-correlation between the output sequence and the received sequence.

2. The method of claim 1, further comprising:
   accumulating, by an accumulator circuit, a correlated sequence to generate the CIR estimation.

3. The method of claim 1, wherein the basic sequence comprises at least one of an Ipatov ternary sequence or a Zadoff-Chu polyphase sequence.

4. The method of claim 1, further comprising determining a counter number of the basic sequence before the performing of the circuit shift and the computing of the inversion parameter based on an order of the output sequence in the SZC sequence block.

5. The method of claim 4, further comprising determining the shift number based on the counter number of the basic sequence and N.

6. The method of claim 4, further comprising determining the inversion parameter based on the counter number of the basic sequence and N.

7. The method of claim 4, comprising generating (M+1) output sequences, M being a product of a number of block repetitions and 2N.

8. The method of claim 7, wherein the received sequence is one of (M−1) output sequences, the (M−1) output sequences excluding a first and a last output sequence of the (M+1) output sequences.

9. The method of claim 1, wherein the circular shift of the chip is performed by shifting chips of the shift number from a left side of the basic sequence to a right side of the basic sequence.

10. A method for determining a channel impulse response (CIR) estimation in ultra-wideband (UWB) communication using a supercomplementary zero-sum correlation (SZC) sequence block, comprising:
   obtaining, from a memory, a basic sequence of N chips and having perfect periodic autocorrelation function (PACF), N being an odd number;
   performing, by a shifting logic, a circular shift of the chips in the basic sequence by a shift number to obtain a shifted sequence, the shift number being a positive number less than N;

computing, by an inverting logic, an inversion parameter of the shifted sequence;

computing, by the inverting logic, an output sequence based on the shifted sequence and the inversion parameter; and transmitting, by an antenna, the output sequence.

11. The method of claim 10, wherein the basic sequence comprises at least one of an Ipatov ternary sequence or a Zadoff-Chu polyphase sequence.

12. The method of claim 10, further comprising determining a counter number of the basic sequence based on an order of the output sequence in the SZC sequence block, before the performing of the circuit shift and the computing of the inversion parameter.

13. The method of claim 12, further comprising determining the shift number based on the counter number of the basic sequence and N.

14. The method of claim 12, further comprising determining the inversion parameter based on the counter number of the basic sequence and N.

15. The method of claim 12, comprising generating (M+1) output sequences, M being a product of a number of block repetitions and 2N.

16. The method of claim 15, wherein the transmitting of the output sequence comprises transmitting (M−1) output sequences of the (M+1) output sequences, the (M−1) output sequences excluding a first and a last output sequence of the (M+1) output sequences.

17. The method of claim 10, wherein the circular shift of the chip is performed by shifting chips of the shift number from a left side of the basic sequence to a right side of the basic sequence.

18. An ultra-wideband (UWB) device, comprising:

a transceiver operable to perform a UWB communication;

a memory for storing program instructions and a database of basic sequences; and a processor coupled to the transceiver and to the memory, wherein the processor is operable to execute the program instructions, which, when executed by the processor, cause the UWB device to perform the following to generate channel impulse response (CIR) estimation based on a supercomplementary zero-sum correlation (SZC) sequence block:

obtaining, from a memory, a basic sequence of N chips and having perfect periodic autocorrelation function (PACF), N being an odd number;

performing, by a shifting logic, a circular shift of the chips in the basic sequence by a shift number to obtain a shifted sequence, the shift number being a positive number less than N;

computing, by an inverting logic, an inversion parameter of the shifted sequence;

computing, by the inverting logic, a output sequence based on the shifted sequence and the inversion parameter;

receiving a transmitted sequence; and performing, by a correlator circuit, cross-correlation between the output sequence and the received sequence.

19. The UWB device of claim 18, wherein the processor is further configured to accumulate, by an accumulator circuit, a correlated sequence to generate the CIR estimation.

20. The UWB device of claim 18, wherein the basic sequence comprises at least one of an Ipatov ternary sequence or a Zadoff-Chu polyphase sequence.

* * * * *